United States Patent [19]

Sammells et al.

[11] 4,346,152
[45] Aug. 24, 1982

[54] LITHIUM-GERMANIUM ELECTRODES FOR BATTERIES

[75] Inventors: Anthony F. Sammells, Naperville; Michael R. St. John, Chicago, both of Ill.

[73] Assignee: Institute of Gas Technology, Chicago, Ill.

[21] Appl. No.: 169,962

[22] Filed: Jul. 18, 1980

[51] Int. Cl.$^3$ ............................................. H01M 4/40
[52] U.S. Cl. ................................. 429/112; 429/218; 75/134 A; 75/134 G; 252/182.1
[58] Field of Search .............. 429/102, 103, 112, 218, 429/194, 197; 75/134 A, 135 G; 252/182.1

[56] References Cited

U.S. PATENT DOCUMENTS

| | | | |
|---|---|---|---|
| 3,506,490 | 4/1970 | Buzzelli | 429/218 |
| 3,607,413 | 9/1971 | Buzzelli | 429/218 |
| 3,960,594 | 6/1976 | Fritz et al. | 429/194 |
| 4,009,052 | 2/1977 | Whittingham | 429/194 |
| 4,011,372 | 3/1977 | Tomczuk et al. | 429/218 |
| 4,076,905 | 2/1978 | Sammells | 429/218 |

*Primary Examiner*—Donald L. Walton
*Attorney, Agent, or Firm*—Thomas W. Speckman

[57] ABSTRACT

This invention relates to lithium-germanium containing electrodes for electrical energy storage batteries, batteries containing such electrodes and a process for fabrication of such electrodes from materials in the charged and uncharged state. The electro-chemically active material may be a binary alloy of lithium-germanium or ternary alloys of lithium-germanium-silicon and lithium-germanium-aluminum. Negative electrodes for electrical storage batteries fabricated according to this invention provide batteries having improved stability over prior art lithium containing electrodes and provides a particularly advantageous negative electrode for use in lithium-metal sulfide batteries having improved stability.

17 Claims, 3 Drawing Figures

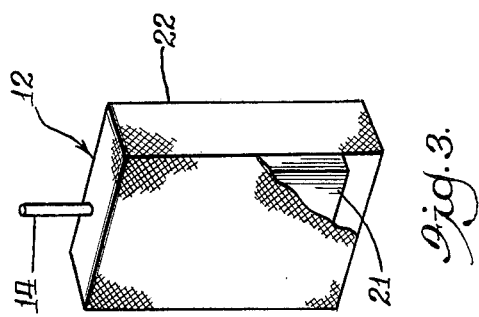
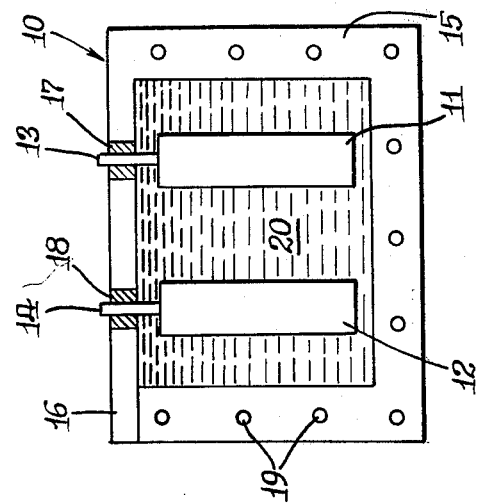
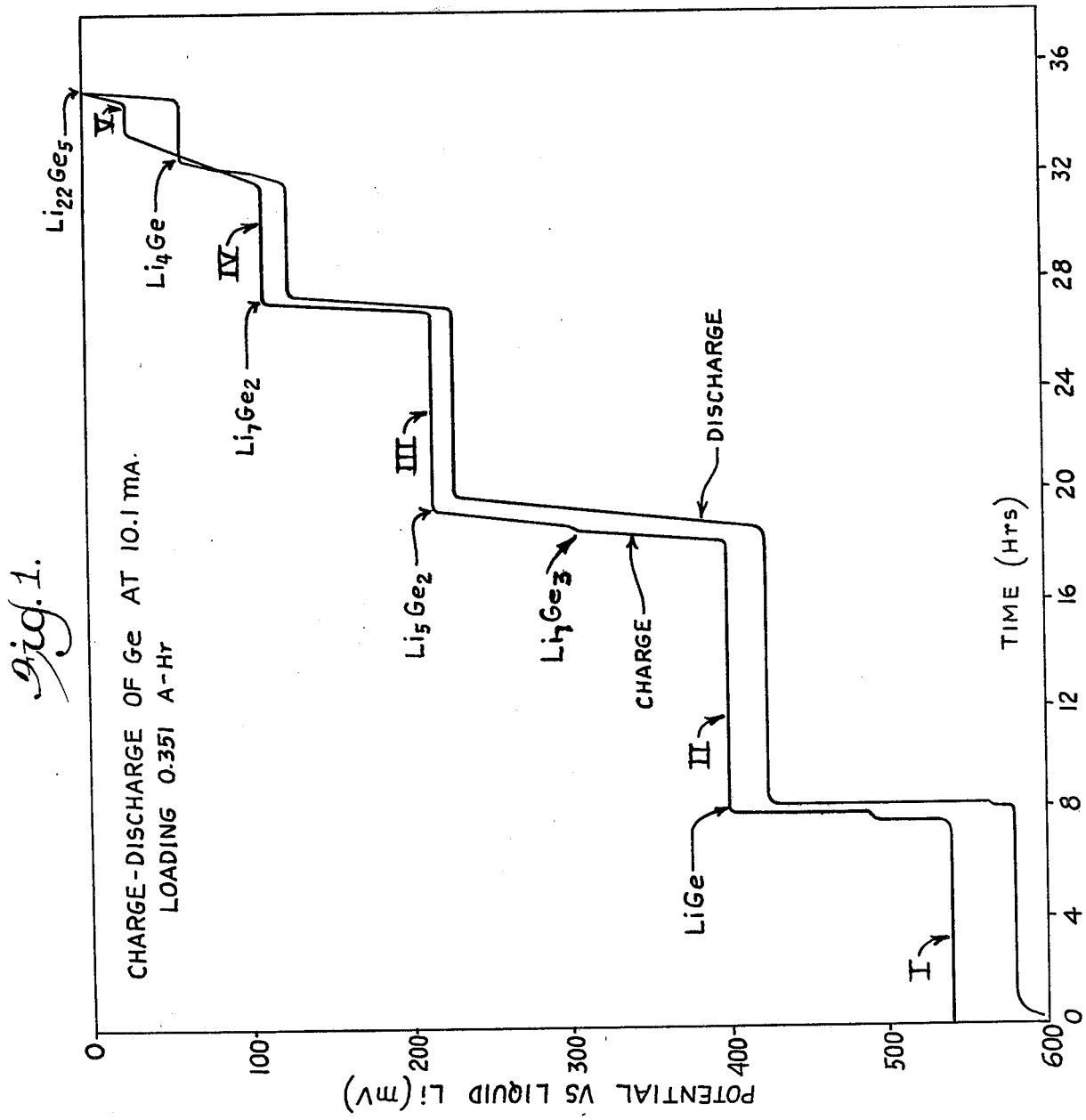

LITHIUM-GERMANIUM ELECTRODES FOR BATTERIES

BACKGROUND OF THE INVENTION

1. Field of the Invention

This invention relates to lithium-germanium containing electrodes for electrical energy storage batteries, batteries containing such negative electrodes and a process for fabrication of such electrodes from materials in the charged and uncharged state.

2. Description of the Prior Art

Utilization of liquid lithium for the negative electrode of a lithium-metal sulfide battery has been proposed due to its low equivalent weight and high cell voltage, thereby providing the potential for higher battery energy densities. The liquid lithium has been retained in a foraminous metal substrate by capillary action for use as a negative electrode. However, under operating conditions of a secondary battery containing a molten salt electrolyte, the electrolyte has been found to react with the lithium and after operation of such a battery for a number of cycles, the liquid lithium leaves the metal substrate increasing cell component corrosion and problems of containment of liquid lithium causing cell instability. Attempts to overcome such problems have been suggested by U.S. Pat. Nos. 3,409,465 and 3,634,144.

The use of solid lithium alloys, such as lithium-aluminum and lithium-silicon, has been suggested as a negative electrode in secondary molten salt batteries. The lithium-aluminum alloy discharges at a cell potential approximately 300 millivolts more positive than liquid lithium, has a capacity of 0.8 Ahr/g and has shown good electrochemical reversability. However, the lithium-aluminum alloy electrode suffers large changes in volume during charging and discharging of the cell and upon cell cycling the alloy morphology changes resulting in loss of capacity. U.S. Pat. No. 3,506,490 suggests alloys such as lithium-aluminum to form a solid electrode material and U.S. Pat. Nos. 3,506,492 and 3,508,967 relate to solid lithium anodes.

The lithium-silicon alloy electrode structure has been suggested by U.S. Pat. No. 3,969,139. However, the lithium-silicon electrode has a capacity of 2.12 Ahr/g and has shown acceptable electrochemical reversability, but when utilized at high current densities the lithium-silicon alloy electrodes tend to become polarized during electrochemical transfer of lithium and it has been observed that silicon migrates from the active electrode portion into the ferrous current collector resulting in embrittlement of the current collector leading to breakdown of the electrode structure. U.S. Pat. No. 4,048,395 teaches lithium-silicon-iron alloys for use as negative electrodes to overcome the tendency of the electrode to polarize at high current densities. The lithium-silicon-iron alloy, however, did not cure the silicon migration into the metal supporting structure causing embrittlement. U.S. Pat. No. 4,076,905 teaches a lithium-silicon-boron alloy for use as a ternary alloy electrode. While the incorporation of boron into the alloy reduces silicon migration, the embrittlement problem has not been completely solved.

SUMMARY OF THE INVENTION

This invention provides an improved negative lithium containing electrode for secondary electrical storage batteries which provides morphological and chemical stability upon cell cycling. The lithium-germanium electrodes of this invention reduce the problem of loss of active material capacity from the lithium-aluminum electrode and reduce problems associated with embrittlement or corrosion of negative electrode current collectors in previous lithium-silicon electrodes.

The electrode of this invention comprises an electrochemically active material which may be a binary alloy of lithium-germanium or ternary alloys of lithium-germanium-silicon and lithium-germanium-aluminum, or may be mixtures of such alloys supported by and in electronic communication with a current collector. Germanium is an advantageous material for use in the active material of a negative electrode for molten salt batteries since it has been found that germanium may be electrochemically charged by lithium in a manner similar to other elements in Group IVA of the periodic table and therefore will not be expected to significantly reduce the Faraday capacity when used as an additive alloying material.

Germanium has been found to charge reversably versus a liquid lithium counterelectrode with coulombic efficiencies of 100 percent. Multiple voltage plateaus were observed with the average discharge potential between the broadest range of plateaus being 343 mV. While metallic germanium has been found to be very corrosive toward 1018 steel in a LiCl-KCl electrolyte, resulting in complete corrosion in less than 24 hours of an 18 mil thick sample, electrodes having 1045 steel current collectors and lithium-germanium alloys for an electrochemically active material resulted in no detectable decrease in capacity or changes in plateau structure upon cycling of electrodes versus liquid lithium between germanium and $Li_{22}Ge_5$ for a period of four weeks. This indicates the alloying of germanium with lithium substantially reduces the corrosive behavior of germanium toward steel. Further evidence of anticipated reduced corrosion effects on ferrous current collectors compared to silicon can be found upon comparison of the relative activities between germanium and silicon. Table 1 lists the partial molar free energies of lithium and germanium along with their corresponding activities for the plateau regions shown in FIG. 1.

TABLE 1

PARTIAL MOLAR GIBBS FREE-ENERGY AND CORRESPONDING ACTIVITIES FOR Li AND Ge AT 400° C. IN THE TWO-PHASE PLATEAU REGIONS

| PLATEAU | $\overline{\Delta G_{Li}}$ kcal/mol Li | $\overline{\Delta G_{Ge}}$ kcal/mol Ge | $a_{Li}$ | $a_{Ge}$ |
|---|---|---|---|---|
| I | −13.10±0.05 | 0 | $5.6 \times 10^{-5}$ | 1.0 |
| II | −9.69 | −13.9±1.0 | $7.1 \times 10^{-4}$ | $3.1 \times 10^{-5}$ |
| III | −5.37 | −27.2 | $1.8 \times 10^{-2}$ | $1.5 \times 10^{-9}$ |
| IV | −3.00 | −32.5 | $1.1 \times 10^{-1}$ | $2.8 \times 10^{-11}$ |
| V | −1.50 | −34.4 | $3.3 \times 10^{-1}$ | $6.7 \times 10^{-12}$ |

Though unit activity of germanium and silicon exist during plateau I, the germanium activity is greatly reduced on reaching the plateau II which is not the case for silicon. A difference of approximately four orders of magnitude exists between the germanium activity and silicon activity in plateau II of their corresponding lithium alloys.

The current cost of germanium, however, renders it uneconomical for use as a binary electrode material in cost effective batteries. It is viable in the production of cost effective batteries to use germanium as an alloying material with either aluminum or silicon to overcome disadvantages of prior lithium-aluminum and lithium-silicon alloys for use as negative electrodes. Germanium is soluble in aluminum to an extent of about 2.8 weight percent at 424° C. and is completely miscible with silicon. The ternary alloy electrode materials according to this invention may be about 2 to 6 weight percent germanium in silicon or 0.5 to 2 weight percent germanium in aluminum and electrochemically charged at a voltage or current sufficient to form the lithium electrode material.

The improved lithium containing electrode is advantageously used as a negative electrode in an electrical storage battery of the type having a lithium containing electrolyte and a positive electrode of metal sulfide active material. The electrolytes for such batteries may, for example, be eutectic mixtures of lithium halides and at least one other metal halide.

It is an object of this invention to provide a negative electrode for electrical storage batteries wherein the electrochemically active material is a binary alloy of lithium and germanium.

It is another object of this invention to provide ternary lithium-aluminum-germanium alloy negative electrodes wherein the germanium additive is electrochemically active.

It is yet another object of this invention to provide ternary lithium-aluminum-germanium negative electrodes for use in lithium-metal sulfide batteries having improved stability over prior art lithium-aluminum alloy electrodes.

It is still another object of this invention to provide ternary lithium-silicon-germanium alloy negative electrodes wherein the germanium additive is electrochemically active.

It is still another object of this invention to provide ternary lithium-silicon-germanium negative electrodes for use in lithium-metal sulfide batteries having improved stability over prior art lithium-silicon alloy electrodes.

These and other advantages and objects will become apparent to one skilled in the art upon reading the following disclosure when taken with the drawings showing certain preferred embodiments.

BRIEF DESCRIPTION OF THE DRAWINGS

FIG. 1 graphically shows a typical charge-discharge curve of a binary lithium-germanium alloy negative electrode of this invention;

FIG. 2 is a diagrammatic representation of an electrical storage battery of this invention; and FIG. 3 is a perspective pictorial view of an electrode of this invention.

DESCRIPTION OF THE PREFERRED EMBODIMENTS

The negative lithium-germanium electrode of this invention comprises electrochemically active material which may be a binary lithium-germanium alloy or a ternary lithium-germanium-silicon or lithium-germanium-aluminum alloy or mixtures thereof in electronic communication with a supporting current collector matrix. Negative lithium-germanium electrodes of this type are particularly suitable for use in electrical storage batteries of the type having metal sulfide active positive electrodes, both electrodes being in contact with an electrolyte which comprises a lithium containing salt which is molten at operating temperatures, such as eutectic mixtures of lithium halide and at least one other metal halide.

The term "alloy" as used in this description and in the appended claims means an intimate mixture of the two or three metals in which the metals may form mixed crystals, solid solutions, or chemical compounds. The same alloy may have the metals present in any combination of these states.

The binary lithium-germanium alloys may be formed by mixing particulate lithium and germanium and heating the mixture to a sufficiently high temperature to form a melt. In a preferred method, the lithium is first heated to 700° C. in an inert atmosphere to which was added powdered germanium in the desired weight percent of the components. Another preferred approach for forming the lithium-germanium alloy is electrochemically in a molten salt electrolyte in the same manner as described in U.S. Pat. No. 3,947,291 for lithium-aluminum and lithium-silicon electrodes. The cell may be assembled with the negative electrode, and preferably both electrodes, in the uncharged state for substantially complete utilization of germanium. Germanium powder may be placed in the negative electrode supporting current collecting matrix and at the positive electrode a mixture of lithium sulfide and iron as uncharged positive active material is immersed in a molten salt electrolyte containing a source of lithium ions and the lithium is coulometrically charged into the negative electrode in the amount to form the desired alloy while at the same time iron sulfide is being formed as the positive electrode.

Binary lithium-germanium alloys have the formula ratios $Li_xGe_y$ wherein x is a number greater than 0 up to 4.4 based upon y being 1. It is preferred that x is a number about 0.1 to 4.4. Specific empirical formulations are shown in FIG. 1. Suitable alloys comprise greater than 0 and up to 30 weight percent lithium, the balance being germanium.

Ternary lithium-germanium-silicon alloys may be produced by solid state diffusion of germanium into silicon at 875° C. in an inert atmosphere to first form the germanium-silicon binary. Charged state lithium electrodes may then be prepared by the direct reaction of the germanium-silicon alloy with lithium at 750° C. as described above. It is suitable for the binary germanium-silicon alloy to contain about 1 to about 10 mole percent germanium and preferably about 2 to about 5 mole percent germanium in the silicon. Suitable lithium-germanium-silicon alloys have the formula ratios $Li_aGe_bSi_c$ where a is a number greater than 0 up to 4.4, b is a number about 0.02 to 0.05, based upon c being 1. It is preferred that a is a number about 0.05 to 4.4. Suitable alloys comprise greater than 0 and up to about 49 weight percent lithium, about 2 to about 6 weight percent germanium, and the balance being silicon.

Ternary lithium-germanium-aluminum alloys may be produced by first preparing the germanium-aluminum binary alloy which may be readily prepared by dissolving germanium in molten aluminum at about 750° C. In the same manner as described above, lithium may be charged into the electrode from the electrolyte of a cell. Germanium-aluminum binary alloys suitably contain about 0.5 to about 3 mole percent germanium and preferably about 1 to about 2.5 mole percent germanium. Suitable lithium-germanium-aluminum alloys have the formula ratios $Li_dGe_eAl_f$ where d is a number greater than 0 up to 1, e is a number about 0.010 to 0.025, based upon f being 1. It is preferred that d is a number about 0.01 to 1. Suitable alloys comprise greater than 0 and up to about 20 weight percent lithium, about 0.5 to about 2 weight percent germanium, and the balance being aluminum.

To form the electrodes of this invention it is usually necessary for the electrochemically active material to be supported on a current collector support in electronic communication with the active material. Suitable current collector matrix materials include iron, steel, stainless steel, molybdenum, tantalum and zirconium. Various matrix structures are known to the art and provide suitable supporting current collecting structure as more fully disclosed in U.S. Pat. Nos. 4,076,905 and 4,003,753, such disclosure being incorporated herein by reference.

It is thus seen that the negative lithium-germanium electrode according to this invention may be produced by contacting a current collector support with germanium, an alloy of germanium-silicon, an alloy of germanium-aluminum or mixtures thereof, and then contacting the current collector support material with such material thereon with a lithium containing molten salt electrolyte in an electrochemical cell in a negative electrode position opposing a positive electrode and electrochemically charging the negative electrode material at a sufficient voltage or current to form electrochemically active lithium-germanium-alloys, lithium-germanium-silicon alloys, lithium-germanium-aluminum alloys, and mixtures thereof.

FIG. 3 shows a representative lithium-germanium electrode 12 of the present invention. Electrode 12 comprises conductor wire 14 in electrical communication with the current collector support having an electrochemically active material thereon indicated as 21. The electrode preferably has perforate container 22 formed from a material such as wire screen. Likewise, the multi-cell honeycomb structure as shown in U.S. Pat. No. 4,003,753 may appropriately be used as the perforate container structure.

This invention provides an electrical storage battery comprising the lithium-germanium electrode described above as the electrically regenerable negative electrode, a positive electrode and an electrolyte, all encased in a suitable casing. FIG. 2 shows battery 10 having housing 15 with cover 16 and providing heating means such as resistance heaters 19. The housing contains electrolyte 20 and positive electrode 11 and negative opposing electrode 12. Each of these electrodes are provided with exterior electrical connectors 13 and 14 respectively, passing to the exterior of the cell through suitable insulators 17 and 18.

The positive electrode may be of any of the materials as pointed out in the U.S. Pat. No. 4,076,905 patent and is preferably iron sulfide for use with molten lithium salt electrolytes.

The electrolytes suitable for use in the battery of this invention are lithium containing electrolytes of the type disclosed in the U.S. Pat. No. 4,076,905 patent. Particularly preferred are the lithium halide containing salts or a eutectic mixture of the lithium halides and other alkali metal or alkaline earth metal halides. Both aqueous and non-aqueous organic electrolytes as are known to the art are suitable.

FIG. 1 shows a typical charge-discharge curve for lithium-germanium alloys in a cell with LiCl-KCl eutectic electrolyte operated at 8 mA/cm$^2$ with loading 0.351 A-hr at a temperature of 420° C. using coulometric titration techniques. Stoichiometries of the lithium-germanium alloys formed were ascertained for the plateaus.

The following specific example is set forth as exemplary of a specific embodiment of this invention and use of specific materials or conditions is not meant to limit the invention.

EXAMPLE

A lithium-germanium binary alloy electrode was fabricated from a AISI 1020 steel current collector having a concavity for placement of the active material. 0.177 grams of germanium powder having a particle size $-200+300$ mesh was placed in the concavity of the current collector and 304 stainless steel screen having 400 mesh openings was welded over the concavity to retain the germanium powder in position. A half cell was assembled in the uncharged state with LiCl-KCl eutectic electrolyte. The cell was operated at a temperature of 400° to 430° C., a constant current of 9.8 mA/cm$^2$ and the lithium-germanium alloy electrode having a loading of 0.287 A-hr. The electrode was charged-discharged over the range of Ge to $Li_{22}Ge_5$, as shown in FIG. 1, through 15 cycles over a period of 35 days with no apparent loss in capacity or coulombic efficiency. There was no appearance of plateaus other than those shown in FIG. 1.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A negative lithium electrode for molten salt electrical storage batteries comprising:

an electrochemically active material selected from the group consisting of lithium-germanium alloys, lithium-germanium-silicon alloys, lithium-germanium-aluminum alloys and mixtures thereof, and a current collector support in electronic communication therewith.

2. The negative lithium electrode structure of claim 1 wherein said lithium-germanium alloys have the formula ratios $Li_xGe_y$ wherein x is a number greater than 0 up to 4.4 based upon y being 1.

3. The negative lithium electrode structure of claim 1 wherein said lithium-germanium-silicon alloys have the formula ratios of $Li_aGe_bSi_c$ wherein a is a number greater than 0 up to 4.4, b is a number about 0.02 to 0.05, based upon c being 1.

4. The negative lithium electrode structure of claim 1 wherein said lithium-germanium-aluminum alloys have the formula ratios $Li_dGe_eAl_f$ wherein d is a number greater than 0 up to 1, e is a number about 0.010 to 0.025, based upon f being 1.

5. The negative lithium electrode structure of claim 1 wherein said current collector is selected from the group consisting of nickel, iron, steel, tantalum and molybdenum.

6. An electrical storage battery comprising a casing enclosing a lithium-containing salt electrolyte which is molten at operating temperatures, a positive electrode and a negative electrode spaced from each other in contact with said electrolyte, said negative electrode comprising a current collector support in electronic communication with an electrochemically active material selected from the group consisting of lithium-germanium alloys, lithium-germanium-silicon alloys, lithium-germanium-aluminum alloys and mixtures thereof.

7. The electrical storage battery of claim 6 wherein said lithium-germanium alloys have the formula ratios $Li_xGe_y$ wherein x is a number greater than 0 up to 4.4 based upon y being 1.

8. The electrical storage battery of claim 6 wherein said lithium-germanium-silicon alloys have the formula ratios $Li_aGe_bSi_c$ wherein a is a number greater than 0 up to 4.4, b is a number about 0.02 to 0.05, based upon c being 1.

9. The electrical storage battery of claim 6 wherein said lithium-germanium-aluminum alloys have the formula ratios $Li_dGe_eAl_f$ wherein d is a number greater than 0 up to 1, e is a number about 0.010 to 0.025, based upon f being 1.

10. The electrical storage battery of claim 6 wherein said current collector is selected from the group consisting of nickel, iron, steel, tantalum and molybdenum.

11. The electrical storage battery of claim 6 wherein said positive electrode comprises metal sulfide active material.

12. The electrical storage battery of claim 6 wherein said electrolyte comprises an eutectic mixture of lithium halide and at least one other metal halide.

13. The electrical storage battery of claim 12 wherein said positive electrode comprises metal sulfide active material.

14. The negative lithium electrode of claim 1 wherein said electrochemically active material is ternary lithium-germanium-silicon alloys.

15. The negative lithium electrode of claim 1 wherein said electrochemically active material is ternary lithium-germanium-aluminum alloys.

16. The electrical storage battery of claim 6 wherein said electrochemically active material is ternary lithium-germanium-silicon alloys.

17. The electrical storage battery of claim 6 wherein said electrochemically active material is ternary lithium-germanium-aluminum alloys.

* * * * *